United States Patent
Asnaashari (10) Patent No.: US 6,327,639 B1
(45) Date of Patent: *Dec. 4, 2001

(54) METHOD AND APPARATUS FOR STORING LOCATION IDENTIFICATION INFORMATION WITHIN NON-VOLATILE MEMORY DEVICES

(75) Inventor: Mehdi Asnaashari, San Ramon, CA (US)

(73) Assignee: Lexar Media, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/580,392

(22) Filed: May 26, 2000

Related U.S. Application Data (63) Continuation of application No. 08/988,844, filed on Dec. 11, 1997, now Pat. No. 6,076,137.

(51) Int. Cl.[7] ...................................................... G06F 12/02

(52) U.S. Cl. ............................ 711/103; 156/165; 156/206; 156/221; 710/53; 365/185.33

(58) Field of Search ..................................... 711/103, 156, 711/165, 206, 221; 710/53; 365/185.33

(56) References Cited

U.S. PATENT DOCUMENTS

| | | |
|---|---|---|
| 3,633,175 | 1/1972 | Harper .............................. 340/172.5 |
| 4,405,952 | 9/1983 | Slakmon .................................. 360/49 |
| 4,450,599 | 5/1984 | Bond et al. .............................. 371/10 |

(List continued on next page.)

FOREIGN PATENT DOCUMENTS

| | | | |
|---|---|---|---|
| 0 557 723 | 1/1987 | (AU) ................................. G11C/5/00 |
| 0 220 718 A2 | 5/1987 | (EP) ................................. G06F/15/40 |
| 0 243 503 A1 | 11/1987 | (EP) ................................. G11B/20/10 |
| 0 424 191 A2 | 4/1991 | (EP) ................................. G06F/11/00 |
| 0 489 204 A1 | 6/1992 | (EP) ................................. G11C/16/06 |

(List continued on next page.)

OTHER PUBLICATIONS

ISBN 0–07–031556–6 Book–*Computer Architecture and Parallel Processing*, Kai Hwang & Faye A. Briggs, McGraw–Hill Book Co., © 1984, p. 64.

1990 WL 2208325 Magazine—"State of the Art: Magnetic VS. Optical Store Data in a Flash", by Walter Lahti and Dean McCarron, Byte magazine dated Nov. 1, 1990, 311, vol. 15, No. 12.

G11C16/06P4A1 Magazine—Technology Updates, Integrated Circuits, "1–Mbit flash memories seek their role in system design", Ron Wilson, Senior Editor, Computer Design magazine 28 (1989) Mar. 1, No. 5, Tulsa OK, US, pp. 30 and 32..

Serial 9Mb F 1992 Symposium of VLSI Circuits Digest of Technical Papers, "EEPROM for Solid State Disk Applications", S. Mehoura et al., SunDisk Corporation, Santa Clara, CA. R. W. Gregor et al., AT&T Bell Laboratories, Allentown, PA. pp. 24 and 25.

*Primary Examiner*—Hiep T. Nguyen
(74) *Attorney, Agent, or Firm*—Maryam Imam (57) ABSTRACT

In a digital system having a host, a controller device and at least one flash memory integrated circuit, a method and apparatus for storing location identification information regarding blocks of information within at least one of the flash memory integrated circuits wherein at least two buffers within the at least one of the flash memory integrated circuits are designated as primary and secondary buffers for storing the identification information in the primary buffer until the primary buffer is effectively full and storing additional identification information in the secondary buffer until it is effectively full, swapping buffer designation so that the primary buffer becomes the secondary buffer and the secondary buffer becomes the primary buffer, erasing the effectively-full buffer for re-use and in this manner, continuously swapping storage of identification information between the two buffers.

22 Claims, 9 Drawing Sheets

U.S. PATENT DOCUMENTS

| | | | |
|---|---|---|---|
| 4,456,971 | 6/1984 | Fukuda et al. | 364/900 |
| 4,498,146 | 2/1985 | Martinez | 36/900 |
| 4,525,839 | 6/1985 | Nozawa et al. | 371/38 |
| 4,616,311 | 10/1986 | Sato | 364/200 |
| 4,654,847 | 3/1987 | Dutton | 371/10 |
| 4,710,871 | 12/1987 | Belknap et al. | 364/200 |
| 4,746,998 | 5/1988 | Robinson et al. | 360/72.1 |
| 4,748,320 | 5/1988 | Yorimoto et al. | 235/492 |
| 4,757,474 | 7/1988 | Fukushi et al. | 365/189 |
| 4,774,700 | 9/1988 | Satoh et al. | 369/54 |
| 4,800,520 | 1/1989 | Iijima | 364/900 |
| 4,896,262 | 1/1990 | Wayama et al. | 364/200 |
| 4,914,529 | 4/1990 | Bonke | 360/48 |
| 4,920,518 | 4/1990 | Nakamura et al. | 365/228 |
| 4,924,331 | 5/1990 | Robinson et al. | 360/72.1 |
| 4,953,122 | 8/1990 | Williams | 364/900 |
| 5,070,474 | 12/1991 | Tuma et al. | 395/500 |
| 5,226,168 | 7/1993 | Kobayashi et al. | 395/800 |
| 5,270,979 | 12/1993 | Harari et al. | 365/218 |
| 5,297,148 | 3/1994 | Harari et al. | 371/10.2 |
| 5,303,198 | 4/1994 | Adachi et al. | 365/218 |
| 5,337,275 | 8/1994 | Garner | 365/189.01 |
| 5,341,330 | 8/1994 | Wells et al. | 365/185 |
| 5,341,339 | 8/1994 | Wells | 365/218 |
| 5,353,256 | 10/1994 | Fandrich et al. | 365/230.03 |
| 5,357,475 | 10/1994 | Hasbun et al. | 365/218 |
| 5,388,083 | 2/1995 | Assar et al. | 365/218 |
| 5,430,859 | 7/1995 | Norman et al. | 395/425 |
| 5,479,638 | 12/1995 | Assar et al. | 395/430 |
| 5,485,595 | 1/1996 | Assar et al. | 395/430 |
| 5,524,230 | 6/1996 | Sakaue et al. | 395/430 |
| 5,544,356 | 8/1996 | Robinson et al. | 395/600 |
| 5,566,314 | 10/1996 | DeMarco et al. | 395/430 |
| 6,076,137 * | 6/2000 | Asnaashari | 711/103 |

FOREIGN PATENT DOCUMENTS

| | | | |
|---|---|---|---|
| 0 522 780 A2 | 1/1993 | (EP) | G06F/3/06 |
| 0 544 252 A2 | 6/1993 | (EP) | G11C/16/06 |
| 0 686 976 A2 | 12/1995 | (EP) | G11C/16/06 |
| 93 01908 | 8/1993 | (FR) | G06F/12/02 |
| 59-45695 (A) | 9/1982 | (JP) | G11C/17/00 |
| 58-215794 (A) | 12/1983 | (JP) | G11C/17/00 |
| 58-215795 (A) | 12/1983 | (JP) | G11C/17/00 |
| 59-162695 (A) | 9/1984 | (JP) | G11C/17/00 |
| 60-212900 | 10/1985 | (JP) | G11C/29/00 |
| 61-96598 (A) | 5/1986 | (JP) | G11C/17/00 |
| 62-283496 (A) | 12/1987 | (JP) | G11C/17/00 |
| 62-283497 (A) | 12/1987 | (JP) | G11C/17/00 |
| 63-183700 (A) | 12/1987 | (JP) | G11C/17/00 |
| 4-332999(A) | 11/1992 | (JP) | G11C/29/00 |
| 84/00628 | 2/1984 | (WO) | G06F/11/20 |

* cited by examiner

METHOD AND APPARATUS FOR STORING LOCATION IDENTIFICATION INFORMATION WITHIN NON-VOLATILE MEMORY DEVICES

CROSS REFERENCE TO RELATED APPLICATION

This application is a continuation of our prior pending application, entitled "A METHOD AND APPARATUS FOR STORING IDENTIFICATION WITHIN NON-VOLATILE MEMORY DEVICES" Application Ser. No. 08/988,844, filed Dec. 11, 1997 U.S. Pat. No. 6,076,137, the inventor which is Mehdi Asnaashari.

BACKGROUND OF THE INVENTION

1. Field of the Invention

This invention relates to the field of digital systems employing non-volatile memory and particularly flash memory as mass storage for computer, digital cameras and the like.

2. Description of the Prior Art

Recently, solid state memory has gained popularity for use in replacing mass storage units in various technology areas such as computers, modem and the like. For example, in a computer system, hard disk drives are employed to store large amounts of information (i.e., programs, data, and other information) and hard disk drives commonly employ rotating magnetic media for such mass storage. Due to various deficiencies however, in rotating media such a lack of physical durability and high power consumption, flash memory is gaining acceptance to replace the conventional hard disk drive. Additionally, more recent digital systems such as digital cameras and network routers also require large storage areas and have started to use flash memory for the storage of information. It should be noted that EPROM is also suitable as a replacement for systems using flash memory devices but it has lower performance.

Flash memory is generally provided in the form of semiconductor devices (or chips) with each device made of a large number of transistor memory cells and each cell being individually programmable. The programming (or writing) and erasing of such a memory cell is limited to a finite number of erase-write cycles, which basically determines the lifetime of the device. Furthermore, an inherent characteristic of flash memory cells is that they must be erased and verified for successful erase prior to being programmed.

In replacing hard disk drives of computer systems with flash semiconductor memory, one of the requirements for the latter to be successful is that its use in lieu of a rotating media hard disk mass storage device be transparent to the system designer and the user. In other words, the designer of a computer incorporating such a semiconductor mass storage device should be able to simply remove the hard disk and replace it with a semiconductor mass storage. All presently-available commercial software should operate on a system employing such a semiconductor "hard disk" without the necessity of any modification. The problem arises however, that as in hard disks, the area of memory that once contained information must first be erased prior to being re-programmed. Unlike a hard disk device, in a flash memory device, an erase cycle is slow and can significantly reduce the performance of a system utilizing flash memory as its mass storage.

Various approaches such as the use of wear-leveling techniques have been devised to manipulate information being stored into flash memory devices in an effort to minimize the devices' erase-write cycle limitations. U.S. Pat. No. 5,485,595, entitled "Flash Memory Mass Storage Architecture Incorporating Wear Leveling Technique Without Using CAM Cells", issued to Mahmud Assar, Petro Estakhri, Siamack Nemazie and Mahmood Mozaffari on Jan. 16, 1996; U.S. Pat. No. 5,388,083, entitled "Flash Memory Mass Storage Architecture", issued to Mahmud Assar, Siamack Nemazie and Petro Estakhri on Feb. 5, 1995; and U.S. Pat. No. 5,479,638, entitled "Flash Memory Mass Storage Architecture Incorporation Wear Leveling Technique", issued to Mahmud Assar, Siamack Nemazie and Petro Estakhri on Dec. 26, 1995, disclose a number of such approaches using space-management schemes. The specifications of these three patents are herein incorporated by reference.

As is disclosed in the above-cited patents, semiconductor mass storage architecture (such as flash memory devices) has blocks of information (each block may include data and overhead information) sized to conform with commercial hard disk sector sizes. These blocks may be also referred to as pages. A semiconductor memory storage device is arranged into N blocks of data with each block of data being an integer number of bytes long. Block sizes are commonly 512 bytes corresponding with a sector length in a commercially-available hard disk drive, although other sector lengths may be used.

In storing and/or retrieving a data file (data files may be any computer files including commercial software, user program, word processor software document, spread sheet file and the like), a computer ( or host) system provides what is referred to as the logical block address indicating the location of where the host believes the data file to exist within the mass storage. Due to the manipulation of data files resulting from space management techniques such as those disclosed in the above-referenced patents, the logical block address is not necessarily the actual address of where the data file may be located. In fact, generally, a controller semiconductor device coupled between the host (in the computer system) and the flash devices translates the logical block address (LBA) into a physical block address (PBA) and uses the latter to access the data file within flash memory.

Stated differently, conventional computer systems are not configured to track continually changing physical locations of data files. Accordingly, each time a data file is changed, it is stored into a new physical location-in the mass storage. Thus, mapping is required of the logical block address (LBA), i.e., the address where the computer system believes the data file is stored, to the physical block address (PBA), i.e., the actual location where the data file can be found in the mass storage unit. In the above-referenced patents, various algorithms are disclosed for determining where within the flash memory (mass storage) the next available free block is located for storing the data file. This function is performed by the space manager unit of the controller device. Space management techniques other than those discussed in the above patents may also be employed.

The correlation between logical block addresses and physical block addresses must be readily available to the controller for efficient storage or retrieval of data files. This correlation provides an essential mapping for finding files, data and the like within flash memory devices.

In systems of the prior art, information regarding the mapping of logical block addresses to physical block addresses is stored within volatile memory, such as RAM, which is located either within the controller device or outside of the controller device. Upon receiving a logical block address from the host, the controller accesses RAM to retrieve a physical block address in association with the host-provided logical block address and uses the retrieved physical block address to access the desired data file. The drawback with such systems is that volatile memory consumes a fair amount of semiconductor "real estate" thereby increasing the size of the controller (given that the volatile memory resides within the controller). Accordingly, costs associated with the manufacturing of such controller devices is similarly increased. If placed outside of the controller device, volatile memory again adds "real estate" to a board or card on which flash memory devices and the controller device reside, (this is in addition to the cost of the controller device itself) thereby increasing manufacturing costs.

Furthermore, use of volatile memory requires "shadow" storage of logical block address to physical block mapping. That is, when the digital system (or computer system by way of example) is turned off and no power is being supplied to the volatile memory, information stored therein including the LBA to PBA mapping, is lost thereby making retrieval of any data files impossible. It is for this reason that prior art systems using RAM to store the LBA-PBA mapping, store the same mapping information in a "shadow" location, which is generally a non-volatile storage area (such as in EEPROM or flash memory). The mapping information is accordingly preserved when power to the system is lost or temporarily interrupted. When power is again restored, the most recent mapping information prior to the loss of power is provided to and stored within volatile memory, i.e., RAM. As can be appreciated, this requires much overhead activity by the controller and reduces system efficiency and performance.

For the foregoing reasons, there is a need within digital systems, to efficiently determine the location of information that is either being retrieved or stored by a host within flash memory devices without foregoing system performance while minimizing the costs associated with the manufacturing of such digital systems.

SUMMARY OF THE INVENTION

It is an object of the present invention to store logical block addresses (LBA) and corresponding physical block addresses (PBA) for identifying blocks of information being accessed within non-volatile memory devices of a digital system in an efficient and inexpensive manner.

It is another object of the present invention to use an LBA and PBA information storage method and apparatus of the type described herein to avoid the use of volatile memory for such information storage.

It is yet another object of the present invention to store LBA and PBA information regarding identification of the location of a block of information within non-volatile memory devices in the same memory devices and particularly within at least two buffer areas within the memory devices wherein the PBA information is continuously updated within one buffer or the other, depending upon the availability of free space within each buffer.

It is still another object of the present invention to continuously swap storage of LBA and PBA information between two buffers located within flash memory devices of a digital system prior to complete usage of any one of the rows of the buffer in use.

It is another object of the present invention to use a controller device in a digital system having at least one flash memory device to transfer information organized in blocks between a host and the flash memory device. Each transferred block having an associated LBA provided by the host to the controller device for identifying the block of information being accessed and the controller device developing a PBA corresponding to each LBA for locating the block of information being accessed in the flash memory device. Within at least one of the flash memory devices, a buffer being defined by an array of N number of LBA rows, with like locations in the buffer being identified by a common LBA. Each LBA row of each buffer being adapted to store a plurality of PBAs including a most recent PBA and the status of each PBA within each LBA row being maintained by a tally value. When at least one of the LBA rows of the buffer becomes full, the most recent PBAs are transferred into a temporary storage location. Thereafter, the buffer is erased.

Briefly, a preferred embodiment of the present invention includes a digital system having a host, a controller device and at least one flash memory device, the controller device being used to transfer information organized in blocks between the host and the flash memory device. Each transferred block has an associated LBA provided by the host to the controller device for identifying the block of information being accessed. The controller device develops a PBA corresponding to each LBA for locating the block of information being accessed in the flash memory device. Within at least one of the flash memory devices, at least two buffers are configured, each buffer being comprised of an array of N number of LBA rows, with like locations in the buffers being identified by a common LBA. Each LBA row of each buffer is adapted to store a plurality of PBAs. One of the buffers is designated as a primary buffer and a second one of the buffers is designated as a secondary buffer, the primary buffer being used to store the most recent PBAs in a particular LBA row. When at least one of the LBA rows of the primary buffer is full, the secondary buffer is used to store the most recent PBAs. During operation of the flash device, the PBA information in the primary buffer is eventually transferred into the secondary buffer, which becomes the new primary buffer, and the original primary buffer becomes the new secondary buffer. The new secondary buffer is eventually erased and as needed, PBA information again stored therein as the PBA information in the new primary buffer is transferred into the new secondary buffer. In this respect, the primary and secondary buffers are continuously used as "ping-pong" buffers to store PBA information depending upon the availability of spare storage locations within each buffer.

DETAILED DESCRIPTION OF THE PREFERRED EMBODIMENTS

Figure 1:
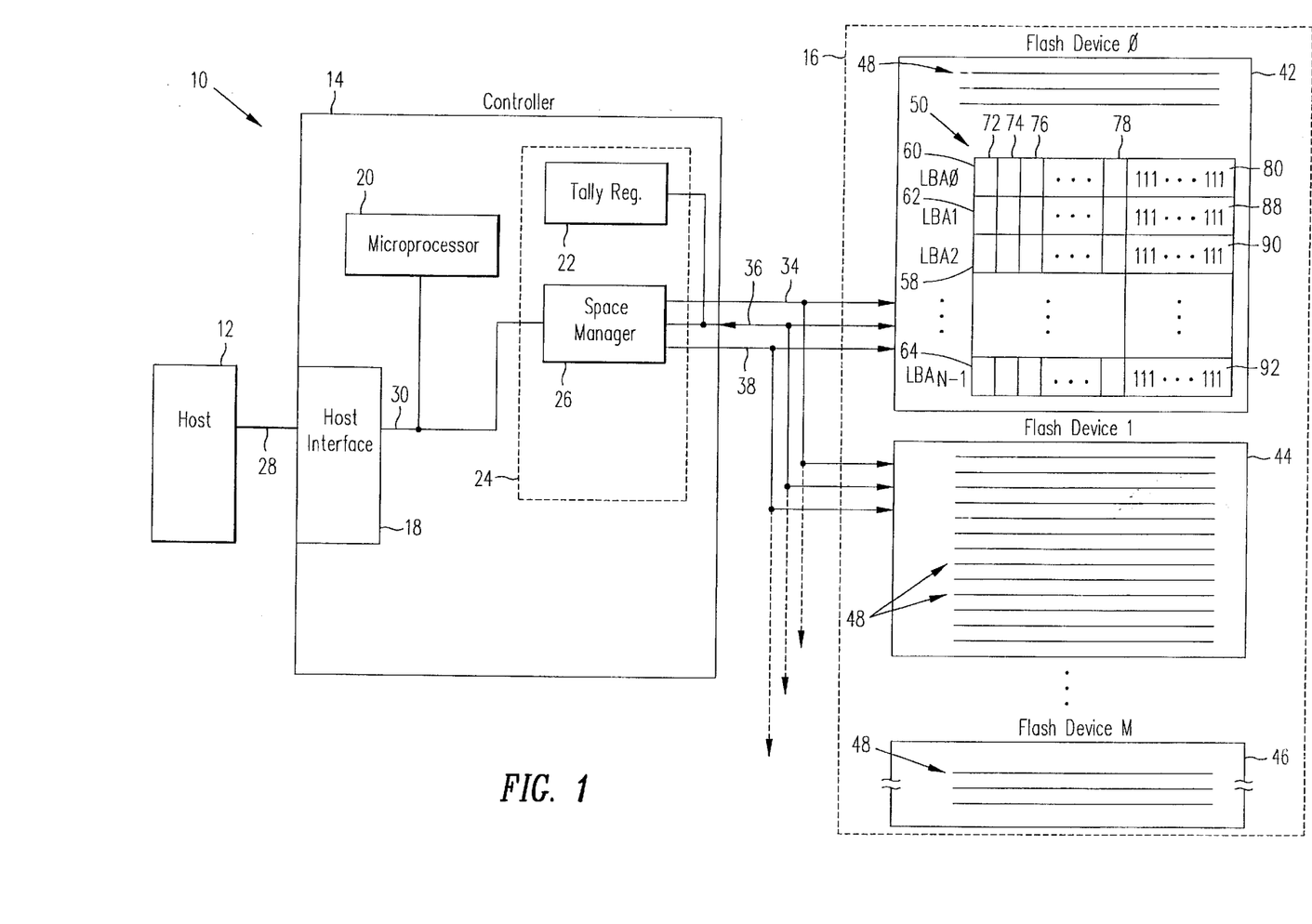
FIG. 1 shows a block diagram of a digital system incorporating a preferred embodiment of the present invention including the use of one buffer within the flash memory devices.

In FIG. 1, a digital system 10, which may be a computer (personal computer (PC)), digital camera, etc., is illustrated to include a host 12, a controller device 14 and a flash memory unit 16. Although not shown in detail, the host 12 includes a motherboard having a central processing unit (CPU), i.e., the "brain" of the digital system, coupled to access information through the controller device 14 from and to the memory unit 16 which, as depicted, is comprised of a flash memory device in accordance with the present invention.

The controller device 14 is an integrated circuit (or semiconductor) shown to include a host interface circuit 18, a microprocessor 20, a flash interface circuit 24. The host interface 24 is depicted to be coupled to the host 12 through host signals 28, which includes an address bus, a bi-directional data bus and control signals (not shown separately). Depending on the architecture of the host being employed, the host address and data busses may be comprised of a single bus carrying both address and data information by multiplexing address and data signals onto the same bus. It should be noted that wherever the term bus is used herein, it refers to multiple electrical conductors or signal lines. The host bus 28 may be a PCMCIA interface, an ATA interface or other kinds of interfaces employed by the industry.

The host interface 18 is shown coupled to the host bus 28 and is further shown to be coupled through a microprocessor bus 30 to the microprocessor 20. Microprocessor 20 is further coupled to the flash interface 24 through the microprocessor bus 30, which facilitates communication of address and data information and control signals therebetween. The flash interface 24 includes a space manager block 26 and optionally includes a tally register 22. The flash interface circuit 24 is coupled to the memory unit 16 through a flash address bus 34, a bi-directional flash data bus 36 and flash control signals 38. The tally register 22, if employed, is used to temporarily store a tally value for use by the space manager 26 and the memory unit 16, as will be explained shortly.

In operation, the host 12 may be required to access the memory unit 16 during performance of various operations such as reading and writing. In doing so, the host 12 provides the address of a block of information it wishes to access (commonly referred to as the logical block address (LBA)) to the controller 14 through the host bus 28. In PC applications, a block of information is typically a sector as employed in conventional hard disk drives, with each sector typically having 512 bytes of data, although other-sized sectors may be similarly employed.

Microprocessor 20 executes instructions in the form of program code from a memory structure (such as ROM (read-only memory) or RAM (read-and-write memory)) located within the microprocessor 20 block (but not shown) to instruct the space manager 26 to translate the LBA, provided by the host, to the next unused (or free) addressable storage block location available within the memory unit 16. The translated address is commonly referred to as a physical block address (PBA). The space manager may employ any one of a variety of algorithms to find the next available (or free) block located within the flash memory devices. An example of a space manager is disclosed in the earlier-referenced U.S. Pat. No. 5,485,595, the disclosure of which is herein incorporated by reference, particularly with reference to FIGS. 11–13, although other space management methods and apparatus may likewise be employed by the present invention.

The PBA designated by the space manager 26 is communicated through the lines 34–38 to the flash memory unit 16. At this time, it should be noted that the flash interface circuit 24 is coupled to receive the LBA provided by the host (to the host interface circuit 18) through the microprocessor bus 30. Memory unit 16 generally includes a plurality of flash memory chips (or devices), labeled as 42–46 (in FIG. 1). These devices are non-volatile memory devices with characteristics as discussed above. FIG. 1 shows M number of flash chips, although for certain applications, a single flash chip may be alternatively employed. Each of the memory devices within the memory unit 16 includes addressable locations 48 for storing information such as data files, and within each flash device 42–46 there may be a predefined storage area for storing LBA-PBA mapping data as schematically indicated at buffer 50.

Each one of the flash devices, shown in the preferred embodiment of FIG. 1, has a capacity of 4 Mbytes and is therefore capable of storing 8192 sectors with each sector being 512 bytes. Flash devices and blocks having alternative sizes may be similarly employed.

Within the buffer 50 is included a plurality of LBA rows, each row individually addressable by an LBA and having multiple PBA storage locations for storing PBA values that are assigned by the space manager. That is, buffer 50 is shown to include N LBA rows 58–64.

Within LBA row 60, is included a number of PBA storage locations, such as PBA storage location 72, 74, 76 and 78. In the illustrated preferred embodiment, each LBA row of the buffer 50 includes 16 PBA storage locations starting with PBA storage location 72, 74, to 78. It should be noted that in alternative embodiments, different numbers of PBA locations may be assigned to each LBA. The number of assigned PBA locations in an LBA row however, may affect the system performance. That is, the greater the number of PBA location per LBA, the less frequently erase operations may be required. Nevertheless, using more PBA locations per LBA row requires more flash memory space and leads to decreasing memory capacity within the digital system 10.

Each PBA location of the preferred embodiment shown in FIG. 1 stores a 16-bit PBA value. This is also a design choice that may be readily different in other embodiments of the present invention.

Each LBA row further includes a tally storage location, which maintains the status of the latest (or most recent) PBA location for a corresponding LBA. Having 16 PBA locations assigned to each LBA row of a buffer requires each tally storage location (within an LBA row) to be 2 bytes wide(or 16 bits with each byte being 8 bits) in order to allow a tally value stored in the tally storage location to point to any of the 16 PBA locations within a row. In the preferred embodiment of FIG. 1, the tally storage locations 80, 88, 90, . . . , 92 are shown to be within the flash device 42 and as such, each tally storage location must have storage space for at least as many bits as there are PBA locations for a particular LBA because each bit in the tally storage location represents the status of each of the PBA values (within each of the PBA locations).

In alternative embodiments, the tally storage location for each LBA row may be located in other than non-volatile memory. For example, a RAM (not shown) or other volatile memory devices either within the controller 14 or located externally to the controller may be used to store the tally values. Furthermore, a counter may be employed and incremented by one when a new PBA is written to an LBA row. In such an arrangement, the tally storage location may store less than the number of PBA locations within an LBA row. For example, where 16 PBA locations are included within an LBA row, the tally storage location may be 4 bits instead of 16 bits. Given 4 bits, the state of 16 PBAs may be represented just as well as using 16 bits. This may be employed in systems using a volatile memory location to store tally values due to their modifiable nature in that the tally value may be changed each time a new PBA is written. But when writing the tally values in nonvolatile memory such as in flash devices (as shown in FIG. 1), the tally value must maintain the same number of bits as the number of PBA locations within an LBA row because the tally value can not be modified or over-written prior to being first erased.

FIG. 1 shows the tally storage location 80 included in LBA row 60, the tally storage location 88 included in LBA row 62, the tally storage location 90 in LBA row 58 and so forth for each of the N LBA rows of buffer 50.

Each tally storage location maintains information regarding the location of the most recent (or current) PBA value corresponding to the LBA of the row in which the tally storage location is located. More specifically, the bits in a tally storage location effectively serve as a pointer to the most current PBA location within the LBA row where the tally storage location is located.

In alternative embodiments, the size of the LBA rows, the PBA locations, the tally storage locations and the number of PBA locations within an LBA row may be other than those discussed above with reference to the preferred embodiment.

Upon the first use of the digital system 10, the flash devices 42, 44 through 46 within the flash memory unit 16 will be erased, and after the erase operation, all of the cells. within each flash device, 42–46, will be set to logic state '1'. Therefore, all tally storage locations 70, 80, 88, 100, . . . will be set to an all '1's (or '111 . . . 111' in binary or 'FFFF' in hexadecimal notation) state as seen in FIG. 1. This indicates that no LBA has yet been accessed by the host or otherwise.

Every time a block having a particular LBA (provided by the host 12) is to be written (or stored) into storage location 48 of one of the flash memory devices within the flash memory unit 16, the particular LBA is assigned a corresponding PBA by the space manager 26 of the controller 14. Assuming by way of example, that a block having an LBA0 is being written, the flash interface circuit 24 will address the row within the flash device 42 wherein LBA0 is located, e.g. LBA row 60. Within the LBA row 60, the bits in the tally storage location 80 will all be at logic state '1' because the first time the digital system 10 is powered-up, the flash memory unit 16 is erased and all of the storage locations within the flash devices of the flash memory unit 16 will be at an erased state of '1'. This indicates that all of the PBA locations within LBA row 60 are available for storage. Therefore, the corresponding PBA, provided by space manager 26, will be stored in the first PBA location 72 within LBA row 60 (starting from the left side of the LBA row 60).

Upon storing the PBA in the first available PBA location, the first bit in the tally storage location 80 in LBA row 60 will be set to logic state '0' (in other words, the value in tally storage location 80 will be '111 . . . 110' (in binary notation) or 'FFFE' (in hexadecimal notation) indicating that the most recent PBA value corresponding to LBA0 is stored in PBA location 72 of LBA row 60. The stored PBA value is then used to locate a block within the flash memory unit 16 to retrieve information during a read operation.

Thereafter, each time LBA0 is accessed for performing a write (or program) operation, a new corresponding PBA value will be written into (or stored within) the next free PBA location of LBA row 60. Moreover, the value stored in tally storage location 80 will be accordingly modified. In this respect, the value stored in tally storage location 80 indicates the location of the most recent PBA value corresponding to the LBA being accessed by the host. During a read operation, the most recent PBA value is used as the address of the location within the flash memory unit 16 to be read. During a read operation however, the PBA value remains the same while during a write operation, a new PBA value is written, as described above.

As a new PBA is written into an LBA row, clearly, there will be less PBA locations available for use in storing PBA values. Finally, when the PBA locations of an LBA row have all been used, there is no more space left for adding new PBA information. At this time or even prior to any one of the LBA rows of buffer 50 being completely full, the controller 14 first transfers the most recent PBA values in each LBA row to a temporary storage location (such as a RAM (not shown) or to other flash memory data file locations 48 in flash device 44 or 46). The most recent PBA values in each LBA row are identified by using corresponding tally values for each row, i.e., the tally value of each LBA row points to the most recent PBA value for that row. For those LBA rows having all ones as their tally value, no PBA is transferred because none has yet been written.

Thereafter, the memory cells defining buffer 50 are erased (this erase operation may include erasure of the entire flash memory device 42). Upon completion of the erase operation, the most recent PBA values are written back into the buffer 50. But they are not necessarily written to the same PBA locations from which they were transferred prior to the erase operation. In fact, they are written to the first corresponding PBA location of each of the LBA rows. The tally values of each LBA row for which a PBA value was written are set to 'FFFE' (in Hex. notation). Rows for which no PBA has been transferred, will have tally values of all '1's (or 'FFFF' in Hex.).

Figure 2:
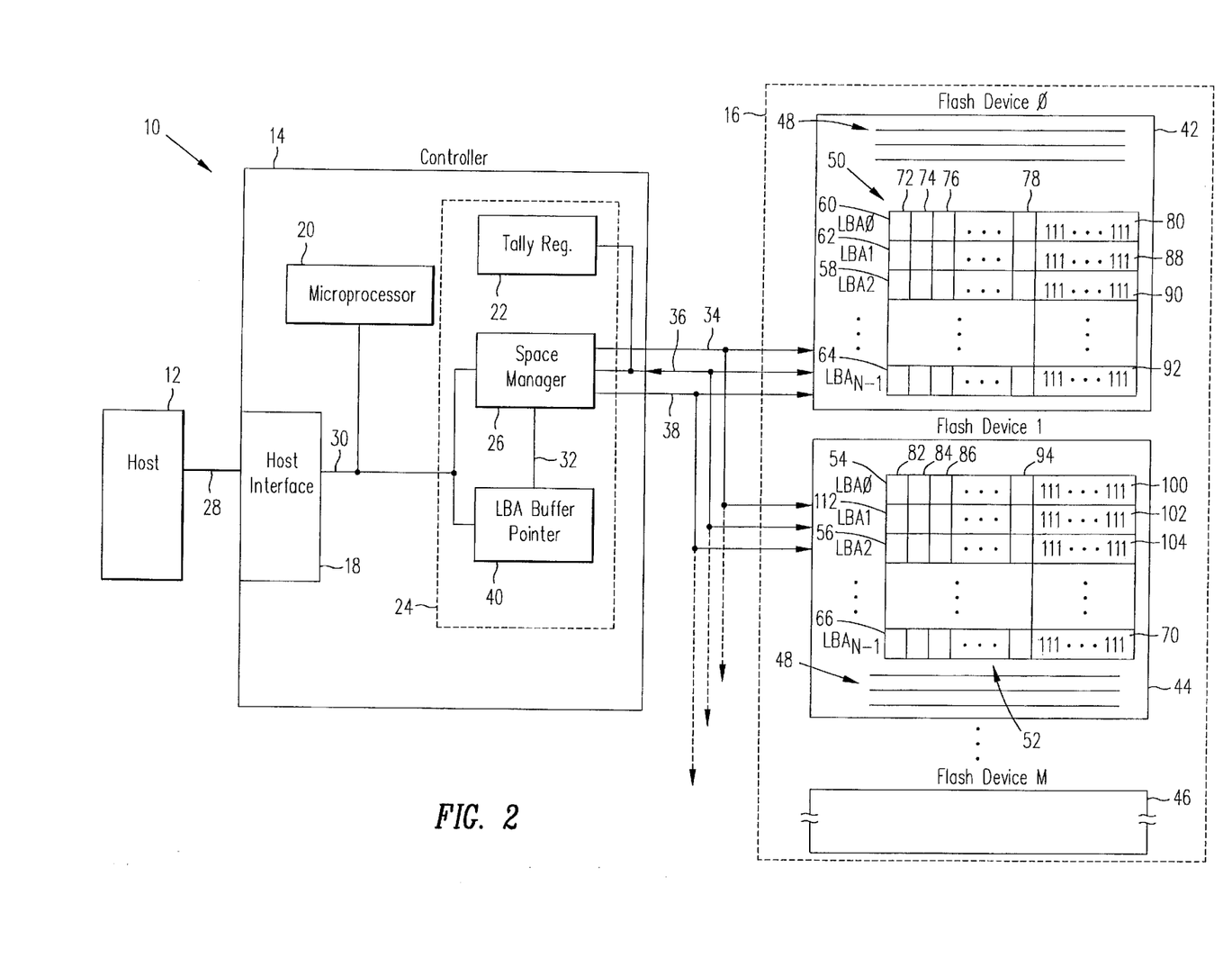
FIG. 2 shows a block diagram of a digital system incorporating an alternative embodiment of the present invention including the use of at least two buffers within the flash memory devices.

The digital system 10 is shown in FIG. 2 to employ another embodiment of the present invention wherein two buffers, buffers 50 and 52, are used to store PBA-LBA mapping information in two different flash devices, 42 and 44, respectively. Alternatively, a single flash device may store two LBA-PBA mappings (not shown), which will be further discussed later. For now, it should be noted that each flash device does not necessarily include one or any LBA-PBA mapping area. That is, portions of the same buffer may be stored in different flash devices. The size of the buffer is a function of the memory capacity associated with the flash devices as well as the number of LBAs and the number of PBAs per LBA.

The flash interface 24 is shown in FIG. 2 to further include an LBA buffer pointer block 40 coupled to the space manager 26 through the signal lines 32. The LBA buffer pointer is also coupled through the microprocessor bus 30 to the microprocessor 20.

In FIG. 2, LBA row 60 is shown as the first row in buffer 50 and LBA row 54 is shown as the first row of buffer 52, both rows being assigned to and addressable by a common LBA, namely LBA0. Similarly, the second row, LBA row 62 and LBA row 112, of each buffer, 50 and 52, respectively, is assigned to LBA1.

Buffer 52 generally stores the same kind of information as that stored in buffer 50. Furthermore, the discussion above with reference to buffer 50 in FIG. 1 pertains to the buffer 52 in FIG. 2. Additionally, the discussion above generally pertains to buffer 52. That is, buffer 52 includes N LBA rows 54, 56, 66 and 112. LBA row 54 is shown as the first row of buffer 52. Both of the first rows, row 60 and 54, in the buffers 50 and 52 are assigned to and addressable by a common LBA, namely LBA0. Similarly, the second row, LBA row 62 and LBA row 112, of each buffer, 50 and 52, respectively, is assigned to LBA1. Likewise, each LBA row in buffer 50 is identified by the same LBA row number as the corresponding LBA row in buffer 52.

LBA row 54 includes PBA storage locations 82, 84, 86 and 94. In this respect, each of the N LBA rows within the buffer 52, includes at least one (preferably more than one) PBA storage location. With the use of two buffers, each LBA row of each buffer has 16 PBA storage locations. Continuing to use LBA0 as an example, LBA0 is assigned a total of 32 PBA storage locations, 16 PBA storage locations 72, 74, . . . 78 in buffer 50 and 16 PBA storage locations, 82, 84, . . . 94, in buffer 54. It should be noted that in alternative embodiments, different numbers of PBA locations may be assigned to each LBA.

FIG. 2 shows the LBA row 54 of buffer 52 to include a tally storage location 100, and LBA row 112 of buffer 52 to include tally storage location 102 and so forth with respect to each of the N LBA rows in that buffer.

In FIG. 2, the flash memory unit 16 is erased upon the first time the digital system 10 is powered-up in much the same way as discussed with respect to FIG. 1. As a result of the erase operation, all of the cells within each flash device, 42–46, will be set to logic state '1'. Therefore, all tally storage locations 70, 80, 88, 100, . . . will all be set to '111 . . . 111' (or 'FFFF' in hexadecimal notation) as seen in FIG. 1. This indicates that no LBA has yet been accessed by the host or otherwise.

During write operations, the PBAs corresponding to the appropriate LBA rows are written into one of the buffers 50 or 52, as earlier discussed. However, having two buffers allows PBAs to be further written into the second buffer after the first buffer is near to or completely full. This will be explained with respect to various examples.

Use of two buffers is performed by creating a "ping-pong" effect. That is, when the first buffer 50 (referred to as the "primary" buffer) is becoming full, the other buffer 52 (referred to as the "secondary" buffer) can be used for further maintaining the LBA-PBA mapping information. The initial designation of the buffers as to which is primary and which is secondary is an arbitrary design choice where buffer 52 may be chosen as the primary buffer and buffer 50, the secondary buffer (for the purpose of discussion, buffer 50 will be initially designated as the primary buffer). Eventually, all of the current information within the primary buffer is transferred to the secondary buffer and the first buffer is erased by microprocessor 20 for re-use. This concept will be better illustrated with reference to FIGS. 2–5.

It may serve helpful at this time to note that the LBA buffer pointer 40 in FIG. 2 tracks the status of buffers 50 and 52, as to indicating whether one or both buffers are in use and which one of the buffers is the primary and which is the secondary buffer. To so indicate, the LBA buffer pointer 40 maintains a 2-bit value regarding the state of buffers 50 and 52 as follows:

TABLE 1

| STATUS REGISTER CONTENTS | STATUS OF BUFFERS |
| --- | --- |
| '00' | Buffer 50 is primary and buffer 52 is not used |
| '01' | Buffer 50 is primary and buffer 52 is secondary |
| '10' | Buffer 50 is not used and buffer 52 is primary |
| '11' | buffer 50 is secondary and buffer 52 is primary |

Alternatively, a dedicated LBA buffer pointer 40 is not necessary and the information shown in Table 1 is maintained by microprocessor 20 in the form of firmware/software code. In the preferred embodiment, upon system start-up, the value in LBA buffer pointer 40 should be restored to the same value maintained therein when the system was last operational. The contents of LBA buffer pointer 40 may be stored in flash memory unit 16 for preservation between power interruptions. Alternatively, the value in the LBA buffer pointer 40 may not be preserved and upon power-up the microprocessor 20 may read the tally values in each of the buffers 50 and 52 to determine which buffer is the primary buffer and which is the secondary buffer. That is, if an LBA row within one of the buffers 50 and 52 has a corresponding tally value of all 'zeroes' then that buffer is the primary buffer and if the corresponding LBA row of the other buffer has a tally value that is other than all ones then it is the latter buffer is the secondary buffer.

If on the other hand, the tally value of the corresponding row of the latter buffer is all 'ones', then the latter buffer is not the secondary buffer. To determine if a secondary buffer is in use, all other rows of the buffer must be searched for tally values being all 'ones' and if such a condition is met, then a determination is made that no secondary buffer is in use.

In the preferred embodiment, the value of the LBA buffer pointer 40 is preserved during power interruptions and it is read upon power-up to determine the state of the primary and the secondary buffers. The first time the system is turned-on, the LBA buffer pointer 40 may contain any value, although a reset signal of the kind generally applied in digital electronics systems may be applied to LBA buffer pointer 40 to ensure having a known value stored therein, such a value may be '00'.

Figure 3:
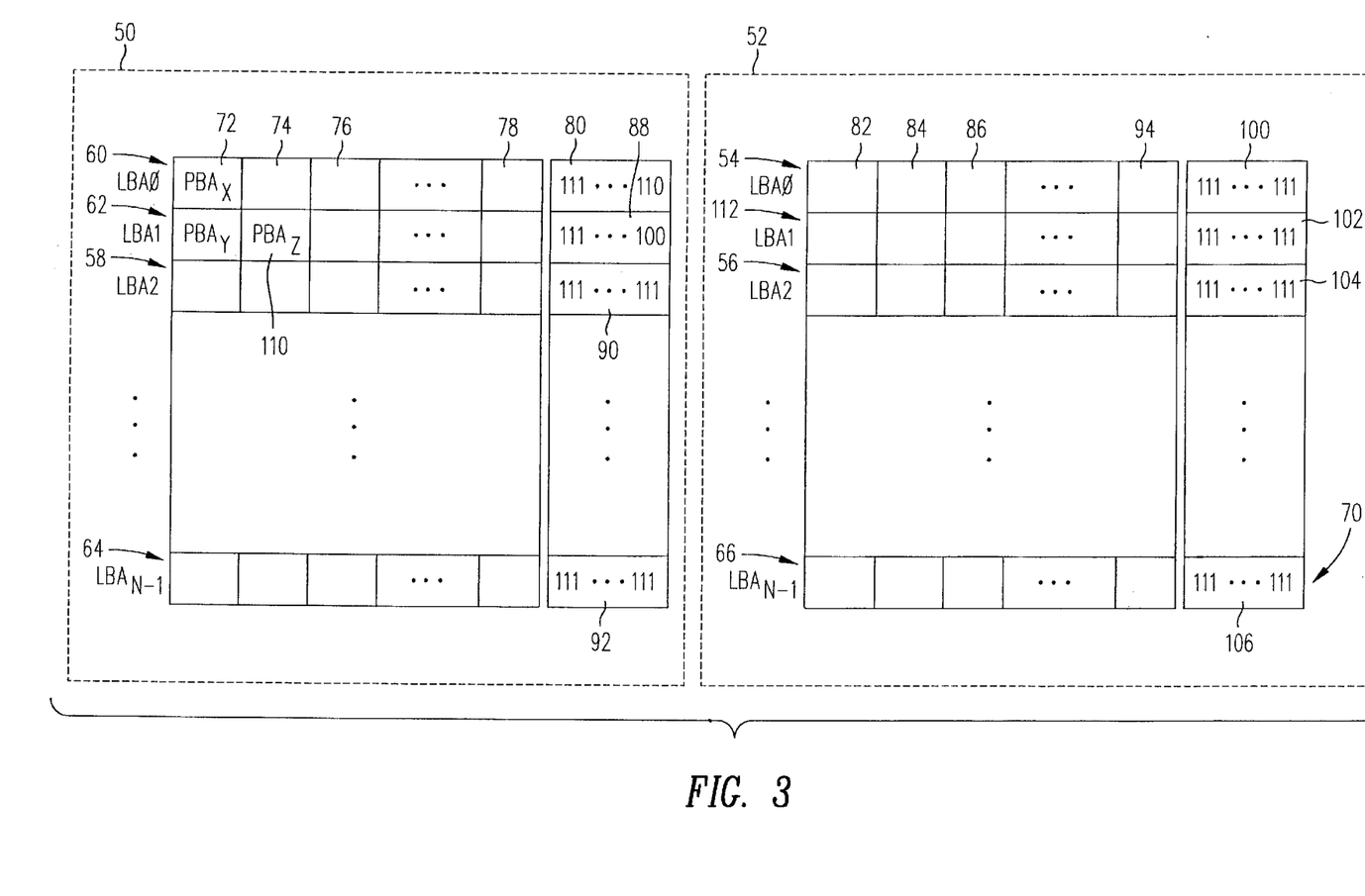
FIG. 3 depicts an example of the status of the primary and secondary buffers in a preferred embodiment of the present invention when the contents of the status register in FIG. 1 is the value '00'.
Figure 4:
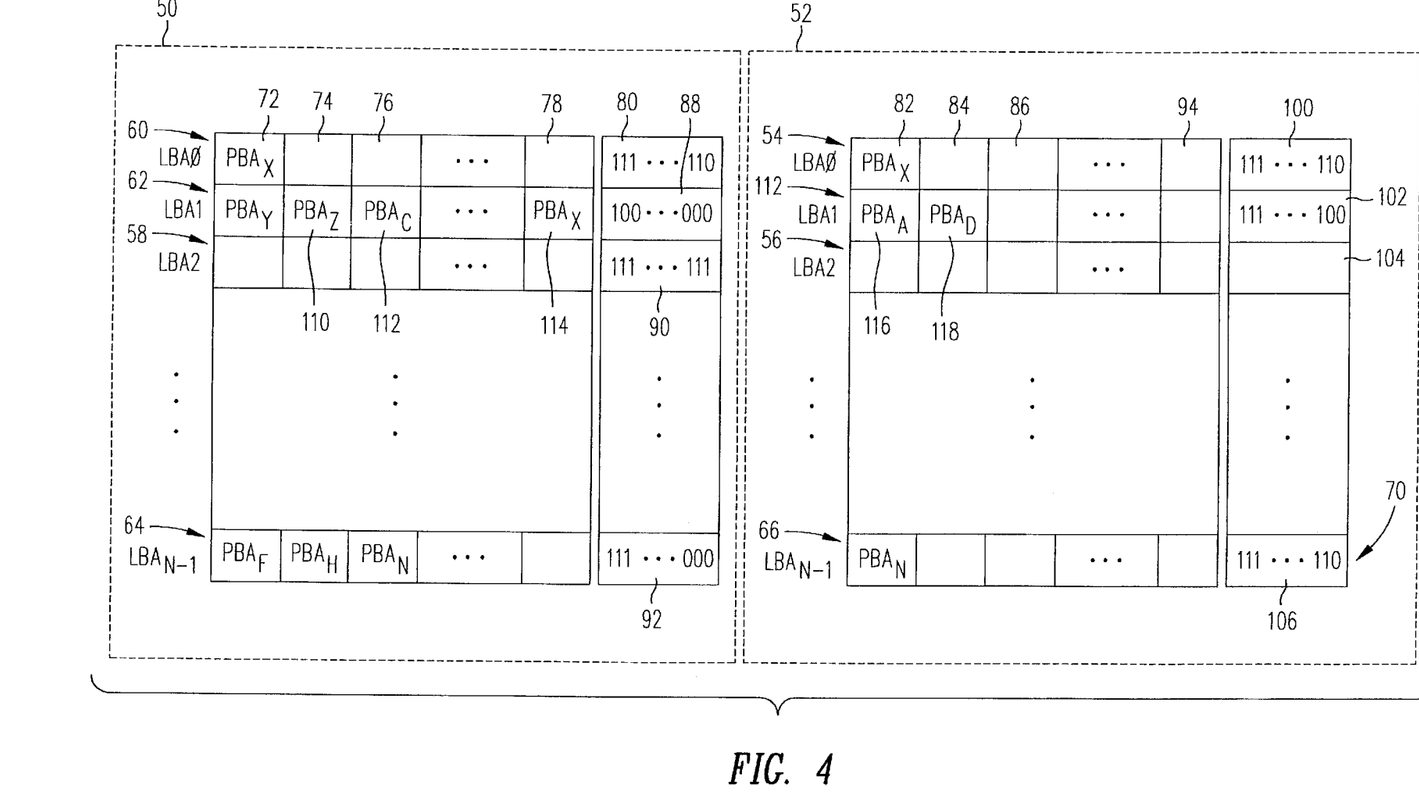
FIG. 4 illustrates an example of the status of the primary and secondary buffers in a preferred embodiment of the present invention when the contents of the status register in FIG. 2 is the value '01'.
Figure 5:
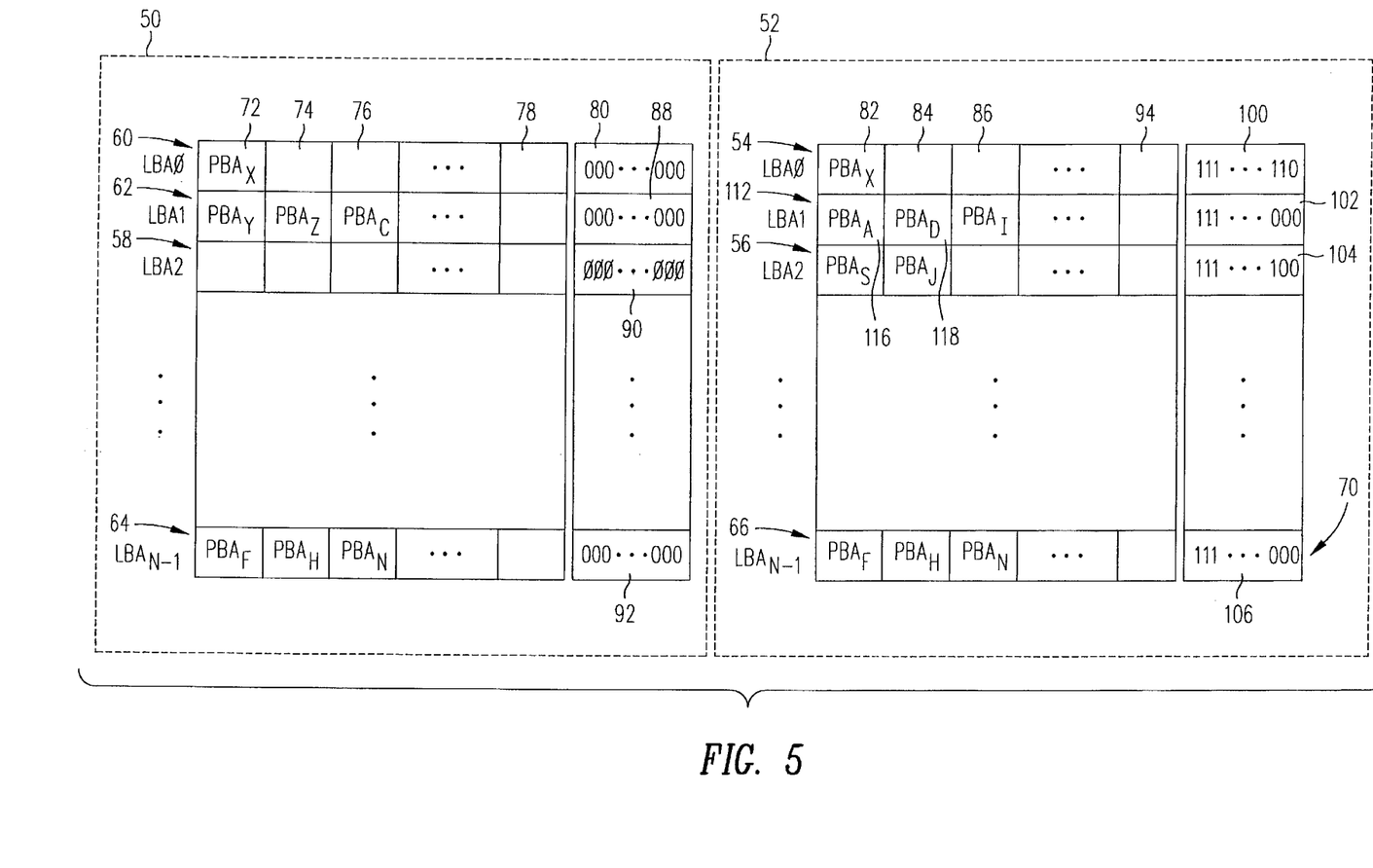
FIG. 5 shows an example of the status of the primary and secondary buffers in a preferred embodiment of the present invention when the contents of the preferred status register in FIG. 1 is the value '10'.
Figure 6:
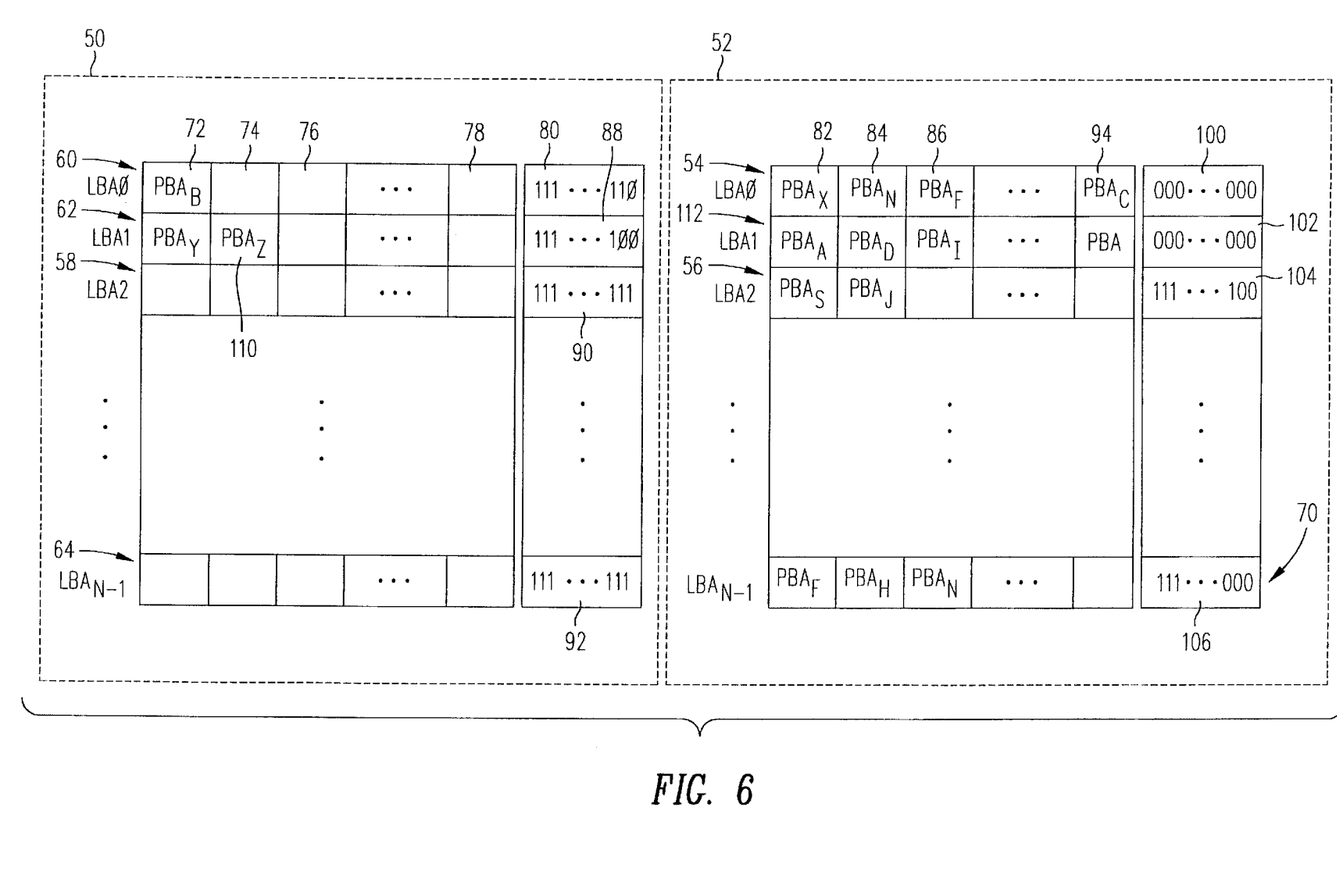
FIG. 6 depicts an example of the status of the primary and secondary buffers in a preferred embodiment of the present invention when the contents of the preferred status register in FIG. 2 is the value '11'.

FIGS. 3–6 illustrate examples of the states of buffers 50 and 52 in accordance with the state of the LBA buffer pointer 40. FIG. 3 is an example of what the states of buffers 50 and 52 may be when the LBA buffer pointer 40 contains the value '00'. FIG. 4 is an example of what the states of buffers 50 and 52 may be when LBA buffer pointer 40 contains the value '01'. FIG. 5 is an example of what the states of buffers 50 and 52 may be when LBA buffer pointer 40 contains the value '10'. FIG. 6 is an example of what the states of buffers 50 and 52 may be when LBA buffer pointer 40 contains the value '11'.

In FIG. 3, since the value in LBA buffer pointer 40 indicates '00', buffer 50 will be designated as the primary buffer and buffer 52 will not be used. It should be obvious to those skilled in the art that the choice of designating a buffer as primary or secondary is initially random. That is, the primary buffer may be initially designated as buffer 52 and the secondary buffer may be buffer 50 without departing from the scope and spirit of the invention.

Now taking LBA0 as an example, the first time it is accessed, its corresponding PBA value will be stored in PBA location 72. Additionally, the value in tally storage location 80 will be modified from 'FFFF' (in hexadecimal notation) to 'FFFE'. This new value in tally storage location 80 accordingly reflects the location of the most recent PBA value corresponding to LBA0, which is PBA location 72. The LBA row 54 in the secondary buffer, buffer 52, remains unchanged because pursuant to the contents of the LBA buffer pointer 40, this buffer is not in use.

Further referring to FIG. 3, as indicated by the value in tally storage location 88, 'FFFC' (in hexadecimal notation), LBA1 has been written at least twice with its most recently-assigned PBA being in PBA location 110. That is, in accordance with the two-least significant bits of the value in tally storage location 88, which are '0's, and the remaining bits being '1's, the second PBA location in LBA row 62 is the most recent PBA value corresponding to LBA 1. The LBA row 112 in the secondary buffer, buffer 52, remains unchanged for the same reason given above with respect to LBA row 60, i.e., the secondary buffer, buffer 52, is not in use.

While the value in LBA buffer pointer 40 (in FIG. 2) is set to '00', PBA entries are made in accordance with the description above until the contents of one of the tally storage locations, 80, 88, ... , 90–92, of the N LBA rows, is all '0's. Upon such an occurrence, during the next write operation of the same LBA row, based upon the tally value being all '0's, the space manager 26 will change the contents of the LBA buffer pointer 40 to logic state '01'. The state of the LBA buffer pointer 40 now indicates that the buffer 50 is the primary buffer and the buffer 52 is the secondary buffer and they are both in use.

FIG. 4 shows an example of buffers 50 and 52 when the contents of LBA buffer pointer 40 (in FIG. 2) is set to logic state '01'. With both buffers in use, measures need to be taken to avoid completely filling any or all of the LBA rows in both buffers. Otherwise, mapping information regarding the relationship between LBAs and PBAs stands to be lost rendering the system inoperative. Prevention of such a situation requires the use of a criteria by which: 1) the mapping information from the primary buffer is transferred to the secondary buffer and 2) erasure of the flash memory chip incorporating the primary buffer is performed, where both the transfer and erase operations are completed prior to the complete usage of any of the rows within the secondary buffer.

Although other criteria may be employed to achieve assurance of a timely transfer, the criteria used in the preferred embodiment is as follows. Whenever the status register contents indicates that there are two buffers in use, that is, when the value in the LBA buffer pointer 40 is either '01' or '11', during the next write of an LBA row within the primary buffer, all of the bits of the corresponding tally storage location in the LBA row being accessed are set to logic state '0' and the corresponding PBA value is actually stored in the secondary rather than the primary buffer. Accordingly, the tally value of the corresponding LBA row of the secondary buffer is modified to logic state "FFFE". This operation however, is not necessary to perform for LBA rows whose tally value is all '0's. In this respect, as each of the LBA rows is accessed, the information in the primary buffer is transferred to the secondary buffer.

An example of this transfer operation is demonstrated in FIG. 4 where the state of status register is set to '01'. The next time LBA row 60 is accessed, for example, during a read operation of one of the locations within the flash memory devices, the value in tally storage location 80 is first noted. Since this value ('FFFE' in hex.) is not equal to all '0's, the PBA value (or entry) in PBA location 72 is transferred to the PBA location 82 (within the LBA0 row of buffer 52). The value in tally storage location 100 of the LBA0 row in buffer 52 is set to 'FFFE', indicating that the location of the most recent PBA is in location 82 of LBA row 54. The value in tally storage location 80 is then set to all '0's, indicating that all PBA values in LBA row 60 are now old.

As they are being written to, remaining LBA rows are similarly transferred from the primary buffer, buffer 50, to the secondary buffer, buffer 52, followed by the corresponding tally value in each LBA row transferred being set to all '0's. As shown in FIG. 4, by way of example with reference to LBA N-1, PBA N, which is the most current PBA value in LBA row 64 is transferred to the first PBA location of LBA row 66 in buffer 52. The value in tally storage location 70 in that row is set to 'FFFE' and the value in tally storage location 92, in LBA row 64, is set to all '0's (not shown in FIG. 4).

During a write operation, the secondary buffer is updated with a new PBA entry. For example, with reference to LBA0, if the system were to write to that block and assuming the state of the primary buffer is as shown in FIG. 4 with the tally storage location 80 having stored therein a value 'FFFE', the new PBA value will be placed in PBA location 82 of LBA row 54 in buffer 52. The value in tally storage location 100 will be set to 'FFFE' and the value in tally storage location 80 will be set to all '0's (not shown). Thus, PBA location 82 will now include the most recent PBA value assigned to LBA0.

For those LBA rows in the primary buffer having tally location values set to all '0's, the preferred embodiment avoids transfer of LBA row information from the primary buffer to the secondary buffer since they have already been moved to the secondary buffer. Likewise, for those LBA rows having values of all '1's in their corresponding tally locations, the preferred embodiment does not transfer any LBA row information from one buffer to another buffer. This is due to the lack of any valid PBA entries in such rows.

To reiterate, once the PBA information of any given LBA row has been transferred from the primary buffer to the secondary buffer, any additional PBA entries for all rows will be stored in the secondary buffer. Similarly, the values in tally storage locations of the secondary buffer, rather than the primary buffer, will be updated to indicate the position of the most recent PBA entry.

Referring still to LBA row 62 in FIG. 4, the value of tally storage location 88 has been set to logic state '0', the PBA values corresponding to LBA1 will be stored in the PBA location of LBA row 112 of buffer 52. In this example, the most recent PBA location is shown to be PBA location 118 as evidenced by the value in tally storage location 102 being 'FFF' (in hexadecimal notation).

Once all of the relevant PBA information for all N LBA rows have been transferred from the primary buffer to the secondary buffer, the contents of LBA buffer pointer 40 (in FIG. 2) is modified to a different state, namely logic state '10'. As earlier suggested, in cases where none of the PBA locations within an LBA row in the primary buffer have been utilized or when an entire LBA row has been utilized, transfer of PBA information is not necessary. FIG. 5 shows an example of what the contents of buffer 50 and 52 may be when LBA buffer pointer 40 is set to '10'. As stated in Table 1, only one buffer is in use in this state and that is buffer 52 if we were to follow the example provided thus far. In fact, the primary buffer is now buffer 52 and the secondary buffer is now buffer 50, which is not used.

Accordingly, PBA values are directly placed in PBA locations of LBA rows within the primary buffer 52 in the same manner as discussed earlier with respect to buffer 50. For example, LBA row 54 includes one PBA entry in PBA location 82 and tally location 100 indicates that this is the most recent PBA entry because the value in tally location 100 is 'FFFE'.

During an erase command, initiated by the microprocessor 20, the contents of buffer 50 will be erased thereby placing the states of all of the storage locations within buffer 50 (such as PBA locations, tally storage locations and the like) at a predetermined erased state, which is generally logic state '1'.

The primary buffer continues to be in-use until one of its LBA rows is full (or near full) as discussed earlier. Upon such an occurrence, the state of LBA buffer pointer 40 (in FIG. 2) will be changed to '11', indicating that buffer 52 will be the primary buffer and buffer 50 will be used as the secondary buffer, as stated in Table 1.

FIG. 6 shows an example of what the buffers 50 and 52 may include when the state of LBA buffer pointer 40 is at logic state '11'. As shown by the contents of tally storage locations 100 and 102, LBA rows 54 and 112 of primary buffer 52 have been completely utilized. With respect to LBA0, secondary buffer 50 includes the most-recently assigned PBA value corresponding to LBA in PBA location 72, as directed-to by the value in tally storage location 80. Similarly, the value in tally storage location 88 'FFFC' shows the most current corresponding PBA, PBA to LBA1 to be in PBA location 110, and so on.

As earlier suggested, when two buffers are in use, the contents of the primary buffer is ultimately transferred to the secondary buffer for each LBA row except those rows which either have not been used (as indicated by their tally values being all '1's) or have been entirely used, as indicated by their tally value being all '0''s. This process is the same as that discussed with reference to FIG. 4 where both buffers were in-use.

Once all relevant PBA information, including tally values in each LBA row of primary buffer 52 have been transferred to secondary buffer 50, the state of the LBA buffer pointer 40 (in FIG. 2) is again changed to logic state '00' and buffer 52 is erased. Logic state '00' in LBA buffer pointer 40 again designates buffer 50 as the primary and only buffer in use.

If the buffers are active and one of the PBA entries of the secondary buffer reaches a "close to full" state, for example, it is three-fourths full, and all of the valid PBAs in the primary buffer have not been moved to the secondary buffer, the microprocessor will move the remaining valid PBAs (valid PBAs are those PBAs for which corresponding tally value for the same row is not either 'FFFF' or '0000') from the primary buffer to the secondary buffer.

It should be apparent that the microprocessor does not have to wait for one of the PBA entries in the secondary buffer to reach the "close to full" state to initiate moving the remaining valid PBAs from the primary to the secondary buffer. The microprocessor may initiate the move as soon as one of the entries in the primary buffer is full. It could then move the particular LBA, along with all of the other valid PBAs belonging to other LBAs and set to the status of the LBA buffer pointer to point to the secondary buffer being the primary buffer with no secondary buffer in use.

Accordingly, the preferred embodiment of the present invention continuously switches storage of PBA-LBA information between the buffers 50 and 52. Swapping between a primary and a secondary buffer (or table) in the manner described herein may be referred to as creating a "ping-pong" effect between the two buffers whereby buffer 50 is the "ping" when it is designated as the primary buffer the "pong" the rest of the time during which it is designated as the "pong." The same applies to buffer 52.

It should be apparent to those skilled in the art that more than two buffers (or tables) may be employed in alternative embodiments of the present invention. Each buffer would similarly include LBA rows where each LBA would have associated therewith, LBA rows of like location within each buffer, such as for example LBA rows 60 and 54 in association with LBA0. It should be further apparent to those skilled in the art that addition of buffers increases the storage space required therefore in the flash memory devices. Moreover, more than two bits of status will be required for indicating the buffer designations where additional buffers are employed.

Figure 7:
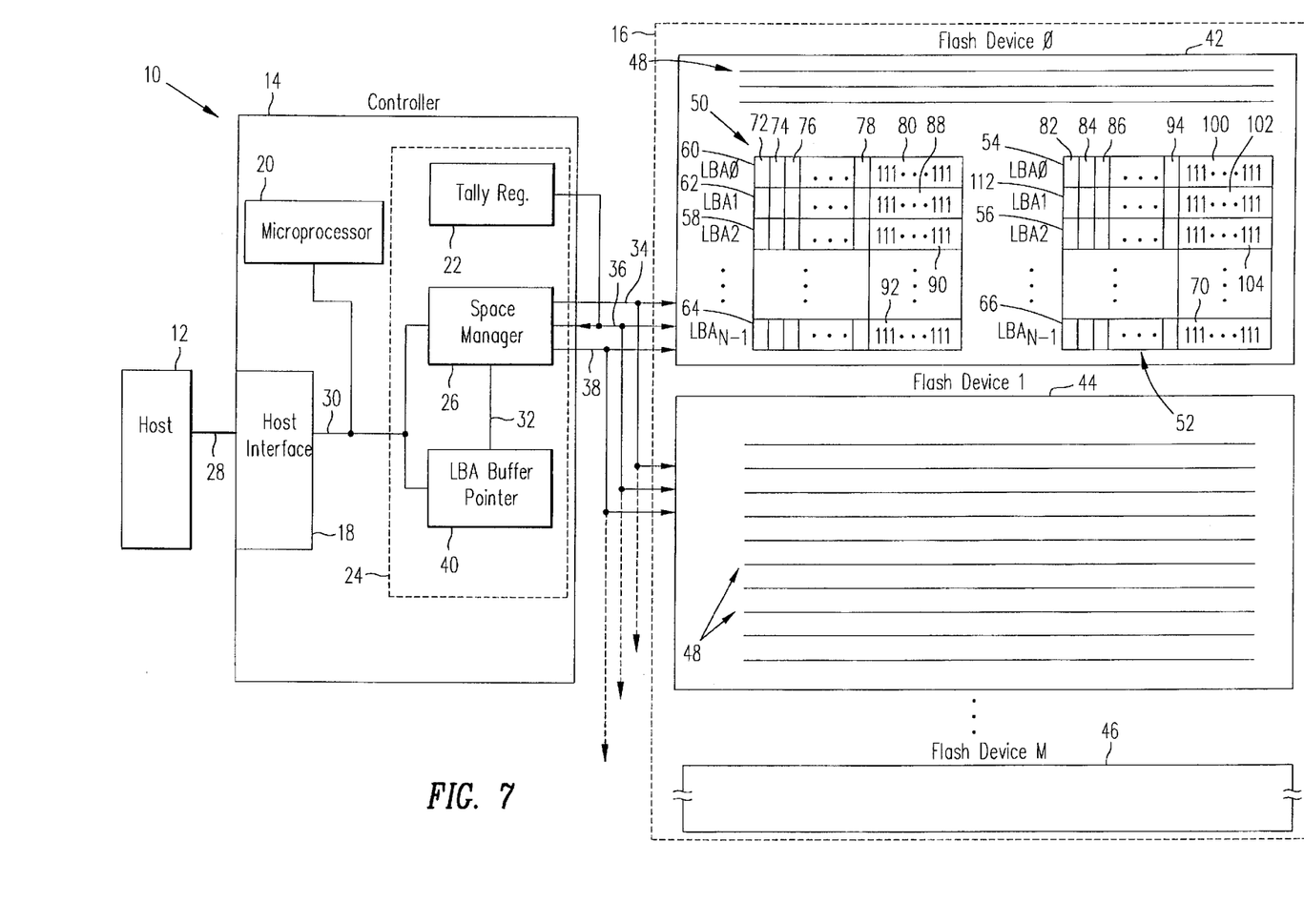
FIG. 7 shows a block diagram of a digital system incorporating an alternative embodiment of the present invention wherein more than one buffer is included within the same flash memory device.

In an alternative embodiment of the present invention, such as illustrated in FIG. 7, buffers 50 and 54 may be stored in the same flash memory device 42 and the remaining flash memory devices may not include any buffers therein. The host 12 still reads/writes blocks of data in 48 of flash memory devices 42, 44, 46 and the like, such as previously discussed. The LBA-PBA mapping information however, is stored in flash memory device 42, specifically within buffers 50 and 52, in the same manner as described with reference to FIGS. 3–6.

It should be appreciated that more than two buffers may be used to store LBA-PBA information. Furthermore, the flash memory unit 16 may be configured to store buffers such as 50 and 52 within any flash memory device.

Figure 8:
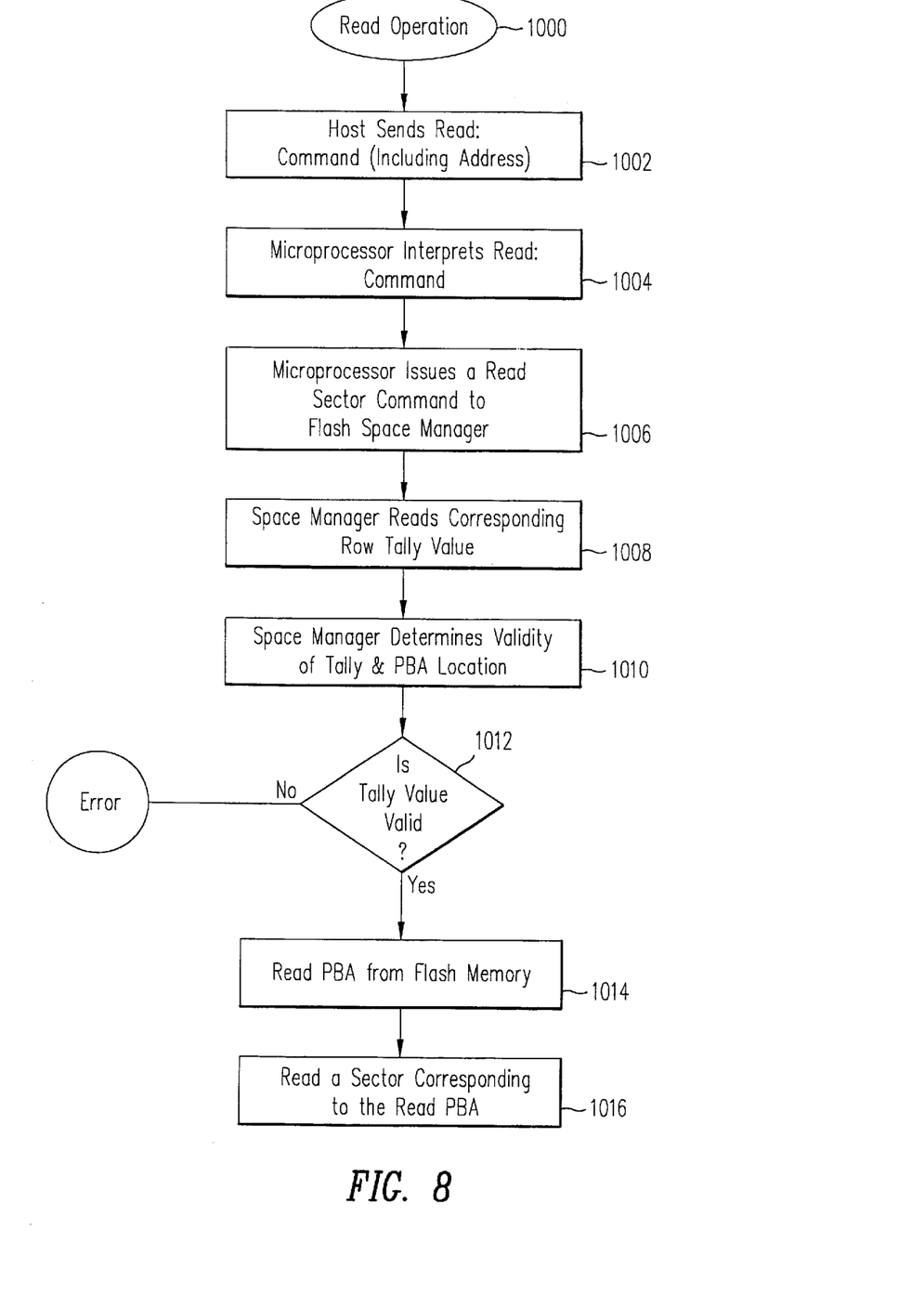
FIG. 8 depicts, in flow chart form, an example of the steps performed by a preferred embodiment of the present invention during a read operation.
Figure 9:
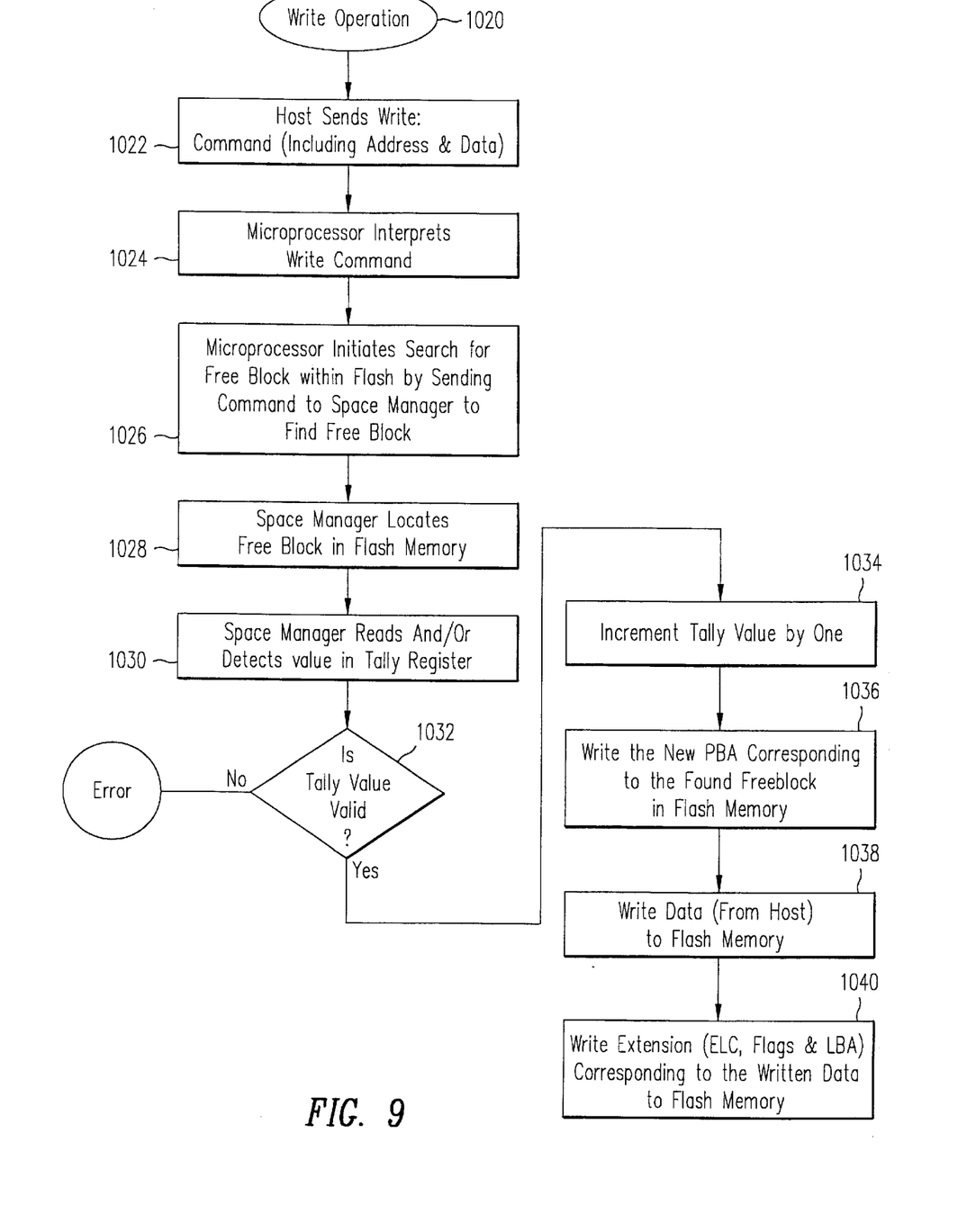
FIG. 9 illustrates, in flow chart form, an example of the steps performed by a preferred embodiment of the present invention during a write operation.

FIGS. 8 and 9, respectively, provide flow charts of read and write operations to and from the flash memory devices using the methods and apparatus of the above-discussed embodiments of the present invention.

In FIG. 8, at step 1000, a read operation is initiated by the host. The host sends a read command at step 1002 which includes an LBA address of the block it desires to read. The microprocessor 20 then interprets the read command at step 1004 and issues a read sector command to the space manager 26 at step 1006.

At step 1008, the space manager reads the tally value stored in an LBA row corresponding to the LBA sent by the host. At steps 1010 and 1012, if the read tally value is a valid value, i.e., it is other than an all ones value, the space manager reads the most recent PBA value at step 1014. A block of information is then read from a location in the flash memory devices identified by the read PBA value at step 1016. Note that at step 1012, if the tally value is not valid, an error condition is returned to the host.

In FIG. 9, an example of a write operation is shown in flow chart form to include step 1020 at which time a write operation is initiated by the host. The host sends a write command at step 1022. During this step, the host provides address and data corresponding to the block of information being written to the controller 14. At step 1024, the microprocessor interprets the write command and initiates a search for a free or available block of memory space within the flash memory devices (at step 1026) by sending a command to the space manager to do the same.

The space manager locates a free block within the flash memory devices at 1028 and at step 1030 reads the tally value, which would have been retrieved from the flash memory if stored there or from a volatile area of memory as discussed previously. If the tally value is determined to be valid at 1032 (i.e. it is not all ones), it is either incremented by one when it is kept in other than non-volatile (or flash memory) or if it is stored in flash memory, the bit of the tally value corresponding to the position of the most recent PBA value in the LBA row being addressed is modified from '1' to '0'.

The new PBA (found by the space manager) value is written in the appropriate LBA row at step 1036 and at step 1038, data is written to the area in the flash memory devices identified by the new PBA. At step 1040, the extension portion of the sector (such as ECC, flags and LBA) is written to the flash memory device.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What I claim is:

1. A method of storing digital information within a nonvolatile memory unit, the nonvolatile memory unit being organized into a plurality of blocks, the digital information having user data and overhead information, the overhead information including translation information, the method comprising the steps of:
    a. storing the user data into a first group of blocks;
    b. storing the overhead information into a second group of the blocks wherein the first group of blocks and the second group of blocks are programmed separately;
    c. designating a primary buffer within one of the second group of blocks, said primary buffer having rows of nonvolatile memory cells; and
    d. programming a block of information within said nonvolatile memory unit one or more times and each time storing the overhead information associated with the programmed block in an unused location within a row of the primary buffer.

2. A method of storing digital information as recited in claim 1 further including the step of designating a secondary buffer within one of the second group of blocks, said secondary buffer having rows corresponding to the primary buffer.

3. A method of storing digital information as recited in claim 1 further including the step of erasing blocks separately.

4. A method of storing digital information as recited in claim 1 further including the step of storing a tally value for indicating the position of the last address of the programmed block within the row in which the tally value is stored.

5. A method of storing digital information as recited in claim 2 further including the step of storing status information indicative of which one of the buffers is the primary buffer and which one of the buffers is the secondary buffer.

6. A method of storing digital information as recited in claim 2 wherein prior to any of the rows of the primary buffer becoming full, transferring the last address of each row having addresses stored therein from the primary buffer to the secondary buffer and thereafter swapping the buffer designation between the primary and secondary buffers so that the primary buffer becomes the current secondary buffer and the previous secondary buffer becomes the current primary buffer.

7. A method of storing digital information as recited in claim 2 wherein when any of the rows of the primary buffer becomes full, transferring the last address for each row having a current address stored therein from the primary buffer to the secondary buffer and thereafter swapping the buffer designation between the primary and the secondary buffers so that the primary buffer becomes the current secondary buffer and the previous secondary buffer becomes the current primary buffer.

8. A method of storing digital information as recited in claim 6 further including the step of storing, within each address row of the current primary buffer, a tally value for indicating the position of the last address within the row in which the tally value is stored.

9. A method of storing digital information as recited in claim 8 further including the step of erasing the contents of the current secondary buffer.

10. A method of storing digital information as recited in claim 9 further including the step of transferring the last address for each row having a current address stored therein from the current primary buffer to the current secondary buffer, thereafter changing the buffer designations so that the current secondary buffer is the primary buffer and the current primary buffer is the secondary buffer and repeating steps d.

11. A method of storing digital information as recited in claim 2 further including the step of defining each of the primary and secondary buffers in more than one of the one or more flash memory devices.

12. A method of storing digital information as recited in claim 2 further including the step of defining more than one of each of the primary and secondary buffers in one of one or more flash memory devices.

13. A nonvolatile memory system for storing user data and overhead information, the memory comprising a plurality of separate and independently addressable blocks distinguishably defined by a respective plurality of physical block addresses including,
    a. a plurality of dedicated data blocks for storing user data;
    b. a plurality of overhead blocks for storing overhead information, wherein the overhead information includes translation information for translating physical addresses identifying the location of user data stored within the memory to logical addresses assigned to user data;
    c. a first buffer defined within one of the plurality of overhead blocks; and
    d. a second buffer defined within one of the plurality of overhead blocks, each of said first and second buffers being arranged in an array of rows, rows of like locations in said buffers being assigned to a unique logical address.

14. A nonvolatile memory system for storing user data as recited in claim 13 wherein each row of each buffer being used to store a plurality of physical block addresses and wherein said first buffer is designated as a primary buffer and said second buffer is designated as a secondary buffer, the primary buffer stores the most recent physical address in each corresponding row as each block is programmed and when at least one of the rows of the primary buffer is full, the secondary buffer stores the most recent physical address in each corresponding row while the physical address information in the primary buffer is transferred into the secondary buffer, upon completion of transfer of the most recent physical address information from the primary buffer to the secondary buffer, the designation of the first and second buffers being interchanged so that the second buffer is designated as the primary buffer and the first buffer is designated as the secondary buffer and the second buffer is erased.

15. A nonvolatile memory system for storing user data as recited in claim 14 wherein the primary buffer for storing the most recent physical addresses in each corresponding row as each block is programmed and when at least one of the rows of the primary buffer is full, the secondary buffer for storing the most recent physical addresses in each corresponding row while the physical address information in the primary buffer is transferred into the secondary buffer, thereafter the designation of said first and second buffers again being interchanged so that the first buffer is designated as the primary buffer and the second buffer is designated as the secondary buffer, wherein storage of physical address information is accordingly repeatedly swapped between said first buffer and said second buffer.

16. A nonvolatile memory system for storing user data as recited in claim 15 wherein the blocks of the plurality of blocks are separately and independently erasable.

17. A nonvolatile memory system for storing user data as recited in claim 15 further including tally storage locations in each row for storing a tally value for indicating the location of the most recent physical address within the row in which the tally value is located, wherein upon transferring physical address information between the primary and secondary buffers, tally values of used rows having other than erased or unused states are transferred with physical address information.

18. A nonvolatile memory system for storing user data as recited in claim 14 further including one or more flash memory integrated circuits, wherein said first and said second buffers are both stored in the same one of the one or more integrated circuits.

19. A nonvolatile memory system for storing user data as recited in claim 14 further including one or more flash memory integrated circuits, wherein said first buffer is stored in a first one of the one or more flash memory integrated circuits and said second buffer is stored in a second one of the one or more flash memory integrated circuits.

20. A digital system including nonvolatile memory unit organized into a plurality of blocks comprising:
   a plurality of dedicated data blocks for storing user data;
   a plurality of overhead blocks for storing overhead information, wherein the overhead information includes translation information for translating logical addresses assigned to user data to physical addresses identifying the location of user data stored within the memory unit;
   a host operative to develop host signals for transferring information organized in blocks, each block having an associated logical address for identifying the block;
   a controller device responsive to said host signals and operative to develop flash signals for transferring the blocks to and from the host;
   at least one flash memory integrated circuit responsive to said flash signals for developing a physical block address corresponding to each logical address for storage in the memory;
   a first table defined within the memory, said first table arranged in an array of rows, each row of said first table for storing a plurality of physical addresses.

21. A digital system as recited in claim 20 further including a second table defined within the memory, said second table arranged in an array of rows, rows of like location in said first and second tables being assigned to a unique logical address, each row of each table for storing a plurality of physical addresses.

22. A digital system as recited in claim 20 wherein each of the plurality of blocks is separately and independently erasable.

* * * * *